Figure 1:
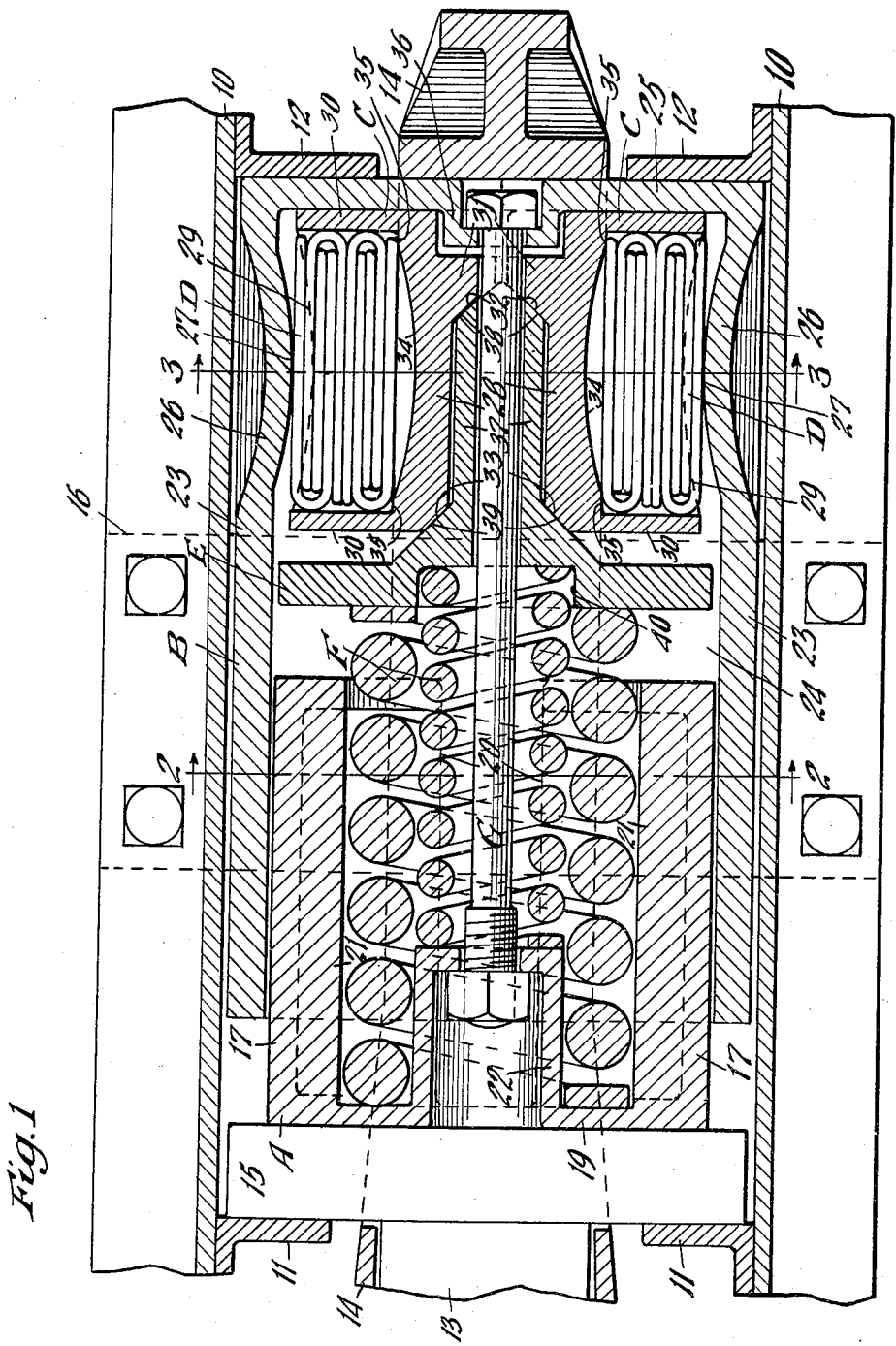

April 18, 1933. W. H. MINER 1,904,379
FRICTION SHOCK ABSORBING MECHANISM
Filed July 16, 1928 2 Sheets-Sheet 2
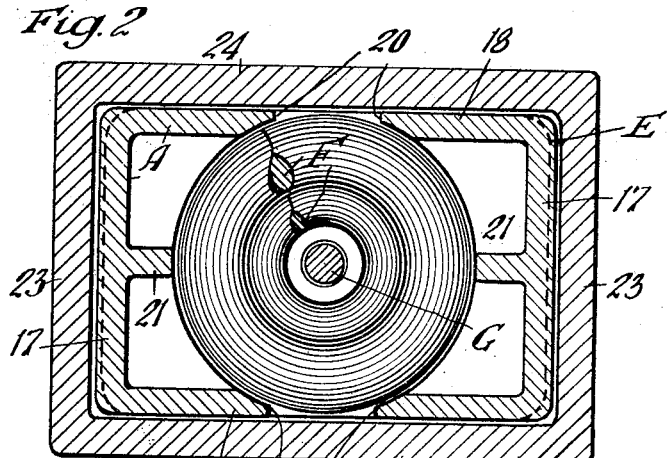
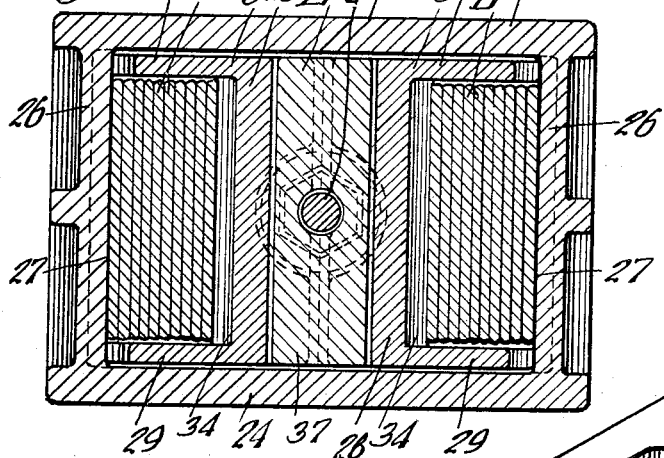
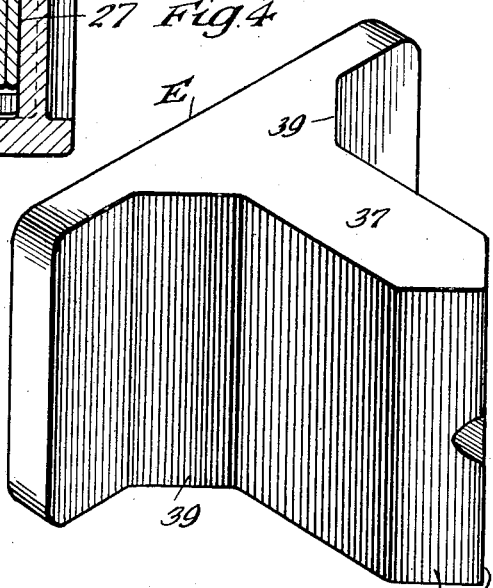
Witness
Wm. Geiger
Inventor
William H. Miner
By Joseph Harris
His Atty.

Patented Apr. 18, 1933

1,904,379

UNITED STATES PATENT OFFICE

WILLIAM H. MINER, OF CHAZY, NEW YORK, ASSIGNOR TO W. H. MINER, INC., OF CHICAGO, ILLINOIS, A CORPORATION OF DELAWARE

FRICTION SHOCK ABSORBING MECHANISM

Application filed July 16, 1928. Serial No. 293,155.

This invention relates to improvements in friction shock absorbing mechanisms.

One object of the invention is to provide a friction shock absorbing mechanism of rugged design having ultimate high capacity and initial low free spring action, wherein the high capacity is produced by resistance means including front and rear casings relatively movable toward each other, one of said casings being provided with opposed, interior, curved abutment faces, two groups of spring plates within the last named casing, the groups of plates being disposed between said abutment faces and the plates of each group being arranged lengthwise of the mechanism, a pair of carriers for said groups of plates, wedge means for forcing said carriers laterally apart and forcing said spring plates against the bearing surfaces to flex the same, and the initial free spring action is produced by a main spring resistance actuated during the first part of the compression stroke of the mechanism and opposing relative movement of the wedge means and one of said followers casings.

Another object of the invention is to provide a friction shock absorbing mechanism of the character indicated, having initial light action and final high capacity provided by combined spring and frictional resistance, wherein the high capacity is produced by mechanism including front and rear relatively movable casings, one of said casings being provided with opposed, interior bearing faces, spring plates within the last named casing, the spring plates being arranged in groups at opposite sides of the casing and cooperating with said bearing surfaces, carriers for the plates disposed within the casing and having frictional engagement with the end wall of the casing, a main spring resistance, and wedge means interposed between the spring resistance and the carriers for forcing the same apart to flex the plates and produce frictional resistance between the carriers and the end wall of the casing, the light initial action being produced by compression of the main spring resistance prior to actuation of the wedge means.

A further object of the invention is to assure in a friction shock absorbing mechanism of the character indicated including relatively movable followers, one of said followers having opposed side walls presenting curved, interior bearing surfaces, a spring resistance cooperating with the other follower, two laminated plate springs interposed between the bearing surfaces of the follower provided with the side walls, a pair of carriers for the laminated plate springs, and a unitary wedge member for forcing said carriers laterally apart, uniform spreading action of the carriers by providing wedging engagement of the wedge member with the opposite ends of the carriers.

Other and further objects of the invention will more clearly appear from the description and claims hereinafter following.

In the drawings forming a part of this specification, Figure 1 is a horizontal, longitudinal, sectional view of a portion of the underframe structure of a railway car, at one end thereof, illustrating my improvements in connection therewith. Figures 2 and 3 are transverse, vertical, sectional views, corresponding respectively to the lines 2—2 and 3—3 of Figure 1. And Figure 4 is a detailed perspective view of a combined spring follower and wedge member, employed in connection with my improved mechanism.

In said drawings 10—10 indicate the usual channel-shaped center or draft sills of the railway car underframe structure, to the inner sides of which are secured front stop lugs 11—11 and rear stop lugs 12—12. The inner end portion of the coupler shank is designated by 13 and a yoke 14 of the hooded type is operatively connected to the coupler shank. My improved shock absorbing mechanism and a front main follower 15 are disposed within the yoke and the yoke in turn is supported by a detachable saddle plate 16 secured to the draft sills.

My improved shock absorbing mechanism comprises, broadly, front and rear casings A and B; a pair of carriers C—C; two laminated plate springs D—D; a combined spring follower and wedge member E; a main spring resistance F; and a retainer bolt G.

The casing A is in the form of a substantially rectangular box-like member having vertically disposed, longitudinally extending side walls 17—17, horizontally disposed, spaced, longitudinally extending top and bottom walls 18—18, and a transverse front end wall 19 bearing directly on the inner side of the main follower 15. The top and bottom walls 18 of the casing A are centrally cut away, as indicated at 20, to accommodate the top and bottom sides of the main spring resistance F. As most clearly shown in Figures 1 and 2, the side walls of the casing A are provided with longitudinally extending, horizontal, interior ribs 21—21, midway between the top and bottom sides thereof, adapted to abut the opposite sides of the outer coil of the main spring resistance F.

As will be evident, the main spring resistance F is thus held in centered position within the casing A by the ribs 21 and the cut-away wall sections at the top and bottom of the casing. The end wall 19 of the casing is provided with an inwardly extending hollow boss 22 which forms an abutment means for the inner coil of the main spring resistance and extends into the outer coil of said spring resistance to hold the same properly centered.

The casing B is also in the form of a substantially rectangular box-like member having longitudinally disposed, spaced vertical side walls 23—23, longitudinally extending, spaced, horizontal top and bottom walls 24—24, and a vertical end wall 25. The end wall 25 cooperates with the stop lugs 12 in the manner of the usual rear follower. As shown, the casing A is telescoped within the front end of the casing B and is thus guided for longitudinal movement with respect to the casing B. The side walls of the casing B are provided with inwardly curved sections 26—26 adjacent the rear ends of the walls, thereby presenting opposed, interior, convex abutment faces 27 which cooperate with the laminated plate springs in a manner hereinafter pointed out.

The carriers C, which are disposed at opposite sides of the mechanism within the casing B, are of similar design. Each carrier C is provided with a vertically disposed, longitudinally extending inner wall 28, top and bottom horizontally disposed walls 29—29, and front and rear end walls 30—30.

As shown most clearly in Figure 1, the wall 28 of each carrier is relatively thick and is provided with an enlarged section 31 at the rear end thereof. The enlarged section 31 is provided with an inner wedge face 32, adapted to cooperate with the combined spring follower and wedge member E. At the forward end, the reduced portion of the wall section 28 is provided with a wedge face 33, also adapted to cooperate with the combined spring follower and wedge member E. On the inner side, the side wall 28 of each carrier is provided with a concave bearing surface 34, to accommodate the laminated plate springs during flexing of the same. As shown in Figure 1, each wall 28 is provided with relatively narrow ledges 35—35 at the opposite ends thereof, which normally support the front and rear ends of the plates composing the laminated spring structure. The rear end walls 30 of the carriers bear directly on the inner side of the end wall 25 of the casing B and have sliding frictional engagement therewith during lateral outward movement of the carriers.

The two laminated plate springs D—D are disposed at opposite sides of the mechanism within the carriers C. Each laminated plate spring comprises two plate spring units, each comprising a plurality of U-shaped plate spring members, arranged in sets and embracing a flat plate spring member. Each unit of the laminated plate spring includes a U-shaped spring plate member having a flat spring plate bearing directly on the inner side of one of the legs thereof and a second U-shaped spring plate having one of the legs thereof interposed between said flat spring plate and the other leg of the first named U-shaped spring plate.

As will be evident, the two U-shaped members of each spring unit are thus interlocked and the flat spring plate is held in position therebetween. The outermost members of the laminated spring plate D bear directly on the curved bearing surfaces 27 of the side walls of the casing B. Upon lateral outward movement of the carriers C, the laminated spring plates D will be flexed against the convex bearing surfaces of the side walls of the casing and the concave surfaces 34 on the inner walls of the carriers will accommodate the flexing of the inner members of said laminated plate springs.

As shown in Figure 1, the end wall 25 of the casing B is provided with an inwardly projecting hollow boss 36, adapted to receive the head of the retainer bolt G. The carriers C are cut away at the rear end, as clearly shown in Figure 1, to accommodate the boss 36.

The combined spring follower and wedge member E comprises a heavy plate-like body portion, having a forwardly projecting post member 37 formed integral therewith. The post member 37 is provided with a pair of inwardly converging wedge faces 38—38 at the outer end thereof, engaging the wedge faces 32 of the casings C. Adjacent the post section 37, the combined spring follower and wedge member E is provided with a pair of wedge faces 39—39 on opposite sides of the post, engaging the wedge faces 33 at the front ends of the carriers C. As clearly shown in Figure 1, the post section 37 extends between the carriers C and has the side walls spaced from the walls 28 of the carriers.

The main spring resistance F comprises a relatively heavy outer coil and a lighter inner coil. The inner coil has its opposite ends bearing directly on the boss 22 and the spring follower section of the combined spring follower and wedge member E, the inner side of the plate-like portion of said member being recessed, as indicated at 40, to accommodate the rear end portion of said inner coil of the spring resistance. The outer coil of the spring resistance has its opposite ends bearing directly on the front end wall 19 of the casing A and the forward side of the combined spring follower and wedge member E.

The mechanism is held of overall uniform length by the retainer bolt G, which also holds the parts assembled. The retainer bolt G has the end thereof disposed within the hollow boss 36 of the casing B and has the nut at the opposite end thereof disposed within the hollow boss 22 of the casing A. As shown in Figure 1, the hollow boss 22 is of such a length as to accommodate the nut of the retainer bolt during the full compression stroke of the mechanism. When the parts are assembled, the bolt is so adjusted that the main spring resistance F is placed under a certain amount of initial compression.

Compensation for wear of the various friction and wedge faces of the mechanism is had by the expansive action of the main spring resistance, the plate-like portion of the combined spring follower and wedge member E being spaced from the front ends of the carriers C, so as to permit rearward movement of the combined wedge and spring follower as the various wedge faces and friction surfaces become worn.

The operation of my improved shock absorbing mechanism, assuming a compression stroke, is as follows: The casings A and B will be moved relatively toward each other, the casing A being actuated through the follower 15. During the relative approach of the casings inwardly of the mechanism, the main spring resistance F will be compressed between the casing A and the combined spring follower and wedge member E, forcing the latter rearwardly and wedging apart the carriers C. During the lateral spreading movement of the carriers C, the laminated plate springs D—D will be flexed by engagement with the bearing surfaces of the casing B. At the same time, the carriers will slip on the inner surfaces of the end wall 25 of the casing B, thereby creating frictional resistance. Frictional resistance is also produced between the wedge faces of the combined wedge and spring follower member and the carriers C during the compression stroke of the mechanism. Relative movement of the casings A and B will continue either until the actuating force is reduced or movement of the follower 15 with respect to the casing B is limited by engagement of the follower with the front end of said casing, and engagement of the member E by the casing A and carriers C, whereupon the actuating force is transmitted directly through the follower and casing B and the members A, E and C, to the corresponding stop lugs of the draft sills, all of the parts referred to together acting as a solid column load transmitting member.

When the actuating force is reduced in release of the mechanism, the tendency of the plates of the laminated plate spring to straighten out effects return of the carriers C to the normal position shown in Figure 1.

Due to the lateral approach of the carriers C, the wedge section of the combined spring follower and wedge member E will be squeezed out from between the carriers and forced forwardly of the mechanism. The expansive action of the main spring resistance restores the casings A and B to their normal full release position.

A decided advantage is obtained by my improved construction involving the wedge member comprising the wedge post having wedge faces at the opposite ends thereof which cooperate with the carriers C for the laminated plate springs, in that the wedging action is uniform at both ends of the carriers C, thereby causing uniform lateral movement of the carriers without angular displacement of the same.

By providing the units of spring plates including the U-shaped members with portions of other plates interposed between the legs of the U-shaped members, the curved connecting portions of the U-shaped plates are of relatively large radius, thus providing exceptionally great strength at the bend. A decided advantage is thus obtained over U-shaped plate members wherein the leg portions are in contact or spaced a slight distance apart because the abrupt or relatively short bend of such plates is subject to breakage during the compression and flexing of the plate springs. The bend of relatively large radius employed in connection with the construction, as herein before pointed out, permits of bending or flexing at this portion of the plate members, thus reducing the danger of breakage to a minimum.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with relatively movable followers, one of said followers having a transverse friction surface, and spaced side walls provided with opposed interior bearing surfaces, said transverse friction surface being disposed in a plane at right angles to the longitudinal axis of the mechanism; of two sets of laminated plate springs at opposite sides of the mechanism, interposed between said bearing surfaces; a pair of carriers for said laminated plate springs, said carriers bearing on and being slidable laterally on the follower friction surface; wedge means for spreading said carriers apart laterally to force the laminated plate springs against said bearing surfaces to flex the same; and a main spring resistance interposed between and bearing at opposite ends on the wedge means and the other follower opposing relative movement of said wedge means and said last named follower toward each other.

2. In a shock absorbing mechanism, the combination with relatively movable followers, one of said followers having spaced side walls provided with opposed interior bearing surfaces; of two groups of spring plates disposed at opposite sides of the mechanism, said spring plates being interposed between the follower bearing surfaces; a pair of carriers for said plates engaged and actuated by means on said follower to effect relative approach of said carriers and the other follower upon compression of the mechanism; wedge means having wedge faces adjacent opposite ends thereof, having wedging engagement with opposite ends of said carriers for spreading said carriers apart; and a main spring resistance opposing relative movement of the wedge member and the last named follower.

3. In a shock absorbing mechanism, the combination with relatively movable main follower members, one of said members having a transverse friction surface and spaced lateral abutment faces; of two groups of spring plates at opposite sides of the mechanism, interposed between said follower abutment faces; a pair of carriers for said plates, said carriers abutting said friction surface of the main follower member and having lateral movement thereon, said carriers being actuated thereby to effect relative approach of said carriers and the other main follower member during compression of the mechanism; a combined wedge and spring follower member, said combined member having a post section extending between said carriers, said post section having wedge faces at the outer end thereof, having wedging engagement with the carriers adjacent one end of the same and the spring follower part of said member having wedge faces adjacent said post section, having wedging engagement with the carriers at the opposite end thereof; and a main spring resistance opposing relative movement of said combined wedge and spring follower member and the last named main follower member.

4. In a shock absorbing mechanism, the combination with relatively movable members adapted to be actuated toward each other during compression of the mechanism, one of said members having spaced walls; of a laminated plate spring means disposed between said members and opposing relative approach of the same, said plate spring means including a plurality of units, each comprising a flat plate spring member and U-shaped plate spring members, said flat plate spring member being embraced at both sides and opposite ends by said U-shaped plate spring members, said units being embraced by the spaced walls of said relatively movable members and the plates of the spring members being disposed transversely between said walls.

5. In a shock absorbing mechanism, the combination with relatively movable members adapted to be moved toward each other during compression of the mechanism, one of said members being in the form of a spring container having spaced walls; of laminated plate spring means interposed between said members and opposing relative approach of the same, said plate spring means including two U-shaped spring members and a flat plate spring, said U-shaped spring members being reversely disposed end for end and the legs of one of said U-shaped members embracing one leg of the other U-shaped member and said plate spring being interposed between said last named leg and one of the legs of the embracing member, said spring means being embraced by the spaced walls of said container and the plate sections of said spring means being disposed transversely between said walls.

In witness that I claim the foregoing I have hereunto subscribed my name this 11th day of July 1928.

WILLIAM H. MINER.